United States Patent [19]

Kaiser et al.

[11] 4,449,401

[45] May 22, 1984

[54] HOT FILM/SWIRL FLUID FLOWMETER

[75] Inventors: Hermann Kaiser, Utica; Jerry A. Olson, Dearborn, both of Mich.

[73] Assignee: Eaton Corporation, Cleveland, Ohio

[21] Appl. No.: 265,119

[22] Filed: May 19, 1981

[51] Int. Cl.³ .................... G01F 1/68; G01F 5/00
[52] U.S. Cl. .................................................. 73/202
[58] Field of Search ................... 73/118 A, 202, 204

[56] References Cited

U.S. PATENT DOCUMENTS

| | | | |
|---|---|---|---|
| 2,870,305 | 1/1959 | Ling | 73/204 X |
| 3,374,673 | 3/1968 | Trageser | 73/204 |
| 3,975,951 | 8/1976 | Kohama et al. | |
| 4,015,473 | 4/1977 | Kleuters | |
| 4,107,991 | 8/1978 | Benson | |
| 4,136,565 | 1/1979 | Migrin et al. | |
| 4,163,390 | 8/1979 | Rodder | |
| 4,164,144 | 8/1979 | Kaiser et al. | |
| 4,182,165 | 1/1980 | Kita | |
| 4,210,016 | 1/1980 | Peter et al. | |
| 4,213,335 | 7/1980 | Peter et al. | |
| 4,214,478 | 7/1980 | Lauterbach | |
| 4,228,768 | 10/1980 | Kita | |
| 4,244,217 | 1/1981 | Ledbetter | |
| 4,245,502 | 1/1981 | Eiermann et al. | |
| 4,245,503 | 1/1981 | Hawk | |
| 4,261,199 | 4/1981 | Sauer | 73/204 |
| 4,264,961 | 4/1981 | Nishimora et al. | 73/204 X |
| 4,299,124 | 11/1981 | Knapp et al. | 73/204 |
| 4,300,391 | 11/1981 | Eiermann | 73/204 |
| 4,304,128 | 9/1981 | Hafner | 73/204 |

*Primary Examiner*—Herbert Goldstein
*Attorney, Agent, or Firm*—C. H. Grace; J. G. Lewis

[57] ABSTRACT

A low pressure drop hot film/swirl air flowmeter (10) for an automotive engine is disclosed. The flowmeter includes a main air flow passage (18), a relatively small venturi (20) disposed within the passage for receiving a portion of the air flow, a constant temperature thermal anemometer (48) positioned to sense the air flowing in the throat (44) of the venturi, and a set of swirl vanes (22) operative to impart a swirl to the remainder of the air in the main passage, thereby creating a reduced pressure at the venturi outlet for forced aspiration therethrough without appreciably increasing the pressure drop across the flowmeter. The anemometer includes a bridge circuit (114), one leg of which comprises a resistive sensor (70) within the throat of the venturi. In the preferred embodiment of the invention, an ambient air temperature sensor (72) is included as another of the legs of the bridge to provide temperature compensation for the flowmeter. The anemometer generates an output signal representative of total mass air flow through the flowmeter.

42 Claims, 7 Drawing Figures

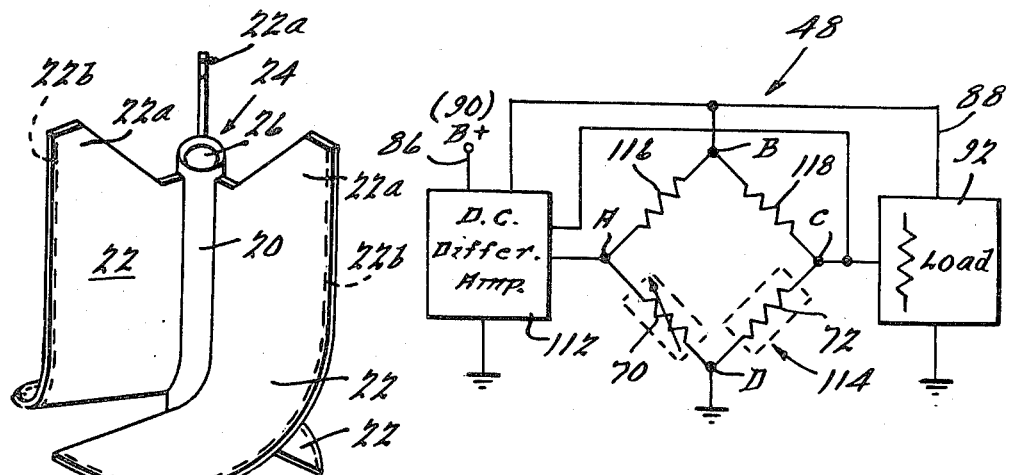
FIG. 3.
FIG. 4.
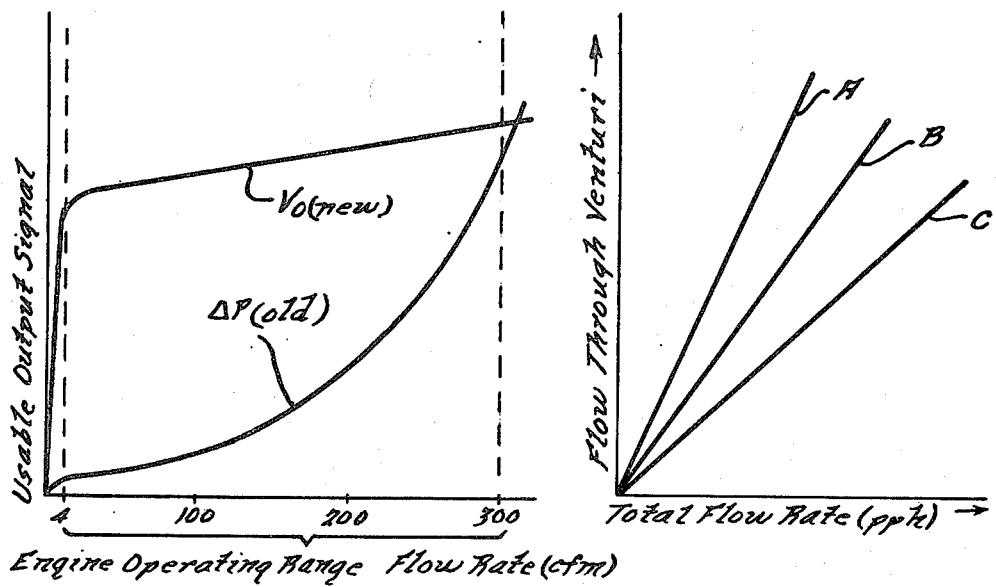
FIG. 5.
FIG. 6.

HOT FILM/SWIRL FLUID FLOWMETER

FIELD OF THE INVENTION

This invention relates to fluid flowmeters in general and particularly to such flowmeters designed specifically for use in automotive internal combustion engines.

CROSS-REFERENCE

The invention described in the present application represents an improvement of that described in the U.S. Pat. No. 4,164,144 and is related to the inventions described in the U.S. Pat. Nos. 4,136,565 and 4,232,549 as well as U.S. Ser. No. 070,593 filed Aug. 29, 1979 U.S. Pat. No. 4,282,751, and U.S. Ser. No. 187,294 filed Sept. 15, 1980 now U.S. Pat. No. 4,324,143.

BACKGROUND OF THE INVENTION

Fluid flowmeters of the pressure drop or differential pressure type are well known. Orifice plate and venturi flowmeters are probably the most common of the pressure drop type. Orifice plate flowmeters are inexpensive, but they are inherently high energy loss devices since the measured pressure drop across the orifice is non-recoverable, i.e. the drop in pressure is a drop in total pressure. Venturi flowmeters are low energy loss devices relative to orifice plate flowmeters since most of the pressure drop in the venturi throat is recoverable at the venturi outlet, i.e. the drop in pressure in the throat is due to an increase in kinetic energy of the fluid. However, when either of these flowmeters are used to measure fluid flow which varies over a wide range, such as air flow to an automotive engine, they either overly restrict total air flow at high engine speeds and loads if they are sized small enough to provide an adequate differential signal at low engine speeds and loads, or they provide an inadequate differential pressure signal at low engine speeds and loads if they are sized larger.

One prior art patent proposed a fluid flowmeter having a main air flow passage and a relatively small venturi in the main passage for receiving a portion of the total air flow and providing a static pressure signal for determining volumetric air flow in conjunction with a stagnation pressure signal in the main passage. This same patent also proposed placing a restriction in the main passage between the venturi inlet and outlet to increase the pressure difference across the venturi and thereby increase the pressure difference between the static and stagnation pressure. However, the restriction has the disadvantage of increasing the total pressure drop across the flowmeter, thereby increasing energy losses and decreasing the operating range of the flowmeter.

An additional shortcoming of many prior art devices resides in the fact that they are dedicated to a particular application and cannot easily be adjusted or reconfigured to accommodate differing applications or operational variations in a given application from system to system. For example, many flowmeters intended for automotive application are designed for an engine of known displacement and idealized respiration characteristics. Such flowmeters are often unsuitable for engines of slightly differing displacement or engines of the same displacement which fall in the outer fringe of design tolerances.

One prior art approach to effectively increase the operating range of a flowmeter while maintaining an acceptable pressure signal level is the bypass, which operates to shunt some of the fluid flowing through the meter around the swirl vanes, orifice, venturi or other signal generating element therein. Although such devices extend the range of operation, they have two major shortcomings. First, an inherent error factor is invited when the totality of air flow is not measured inasmuch as the ratio of measured air flow to bypassed air flow may vary. Additionally, such devices add mechanical complexity with its incumbent cost, reduced response (due to the mass of the moving parts) and shortened lifetime (due to the exposure of the interface between moving and non-moving parts to moisture and contaminants within the air flow). Finally, the use of pneumatic sensing techniques, although enjoying some commercial success, suffers from the frailties of requiring sensing ports which can become blocked by foreign matter and may have a unacceptably short useful life.

Another prior art approach which overcomes some of the shortcomings of pneumatic sensing is the use of hot wire anemometers or the like. Such devices operate by presenting a temperature dependent resistive element to the fluid flow and pass a current therethrough. The cooling effect of the fluid as it impinges upon the sensor is offset by modulation of the control voltage or current to maintain the resistor at a constant temperature. The variation of voltage or current is a measure of air flow. A substantial amount of literature has appeared recently relating to such techniques as reflected in many prior art patents.

The hot wire anemometer, however, has several shortcomings of its own. One shortcoming is lack of accuracy. Because the heated element is fixed within a fluid passageway and the velocity inlet profile of the fluid varies substantially with various operating conditions, prior art units were forced to tolerate nominal or compromise arrangements which built in error to the fluid flow measuring process. A related problem was in the fact that the temperature sensing elements were fixed within the passageway and could not be readily calibrated once the unit was fully assembled. The most serious shortcoming, however, was in the inherent fragile nature of the flow sensing elements. Prior art designs, in order to improve response characteristics of the device attempted to minimize the thermal mass of the sensing element by making it extremely fine. Although successful laboratory tests were achieved, the application of such devices in a relatively hostile automotive environment where foreign particle matter pass through the meter at high velocity lead to catastrophic failure of the device by breakage of the sensing element. The elements were also extremely sensitive to engine backfire.

BRIEF DESCRIPTION OF THE INVENTION

The present invention overcomes the above described shortcomings by providing a fluid flowmeter which employs constant temperature thermal anemometer techniques to generate a useable output signal representative of total fluid flow while maintaining an extremely durable yet simple and inexpensive design. This is accomplished by an inventive flowmeter comprising a main passage for fluid flow, a secondary passage which extends substantially parallel to the main passage including an inlet for receiving a portion of fluid flowing in the main passage, a throat and an outlet for discharging the portion back into the main passage, and an anemometer which monitors the flow rate of the portion of fluid in the throat of the secondary passage and generates an output signal representative of total flow rate through the flowmeter. This arrangement provides the advantage of a simple flow meter design which has extremely fast response, increased low-end sensitivity, permits mass flow measurement without the use of a pressure sensor, eliminates fragile construction typical of hot wire sensors and reduces top-end total pressure drop.

In the preferred embodiment of the invention, swirl vanes are provided which operate to receive the portion of the fluid which does not pass through the secondary passage and imparts a velocity vector thereto tangetial to the axis of the main passage for creating a reduced pressure area at the outlet of the secondary passage. This arrangement has the advantage of establishing forced aspiration through the secondary passage to ensure that total flow rate is being measured.

According to another aspect of the invention, the anemometer includes an ambient temperature compensating probe which measures the ambient temperature of the fluid entering the flowmeter and recalibrates the anemometer to factor out the effects of temperature change in flow rate calculations. This arrangement has the advantage of providing a fluid flowmeter which produces a useable output signal representative of true mass flow rate over widely varying ambient temperature conditions.

According to another aspect of the invention, the anemometer includes a temperature dependent resistance element within the throat of the secondary passage and which is selectively displaceable for calibration purposes. This arrangement has the advantage of providing a flowmeter which ensures unit to unit repeatability as well as application flexibility.

According to another aspect of the invention, an aerodynamically shaped deflector is positioned adjacently upstream of the inlet of the secondary passage. The precise shape of the deflector is empirically derived to ensure smooth laminar fluid flow for the intended application while presenting an obstruction to foreign objects within the fluid stream which could otherwise impact and damage the temperature dependent resistance element. The deflector is selectively axially adjustable for purposes of fine tuning the flowmeter.

According to still another aspect of the invention, the anemometer in general and the temperature dependent resistance element in particular is designed to sense uni-directional fluid flow. This arrangement has the advantage of sensing fluid flow only in one direction through the flowmeter such as into an internal combustion engine but not sensing reverse flow such as during backfires or the like.

These and other features and advantages of this invention will become apparent upon reading the following specification, which, along with the patent drawings, describes and discloses a preferred illustrative embodiment of the invention in detail.

The detailed description of the specific embodiment makes reference to the accompaning drawings.

BRIEF DESCRIPTION OF THE DRAWINGS

FIG. 3, is perspective view of the swirl vane-venturi assembly employed within the flowmeter of FIG. 1;

FIG. 4, is a schematic diagram of the constant temperature thermal anemometer employed within the flowmeter of FIG. 1;

FIG. 5, is a differential pressure and output voltage (usable output signal) versus flow rate response graph contrasting the present invention with a typical prior art device; and FIG. 6, is a venturi flow versus total flow rate response graph taken for three various experimental configurations having different venturi area ratios.

DETAILED DESCRIPTION OF THE SPECIFIC EMBODIMENT

Figure 1:
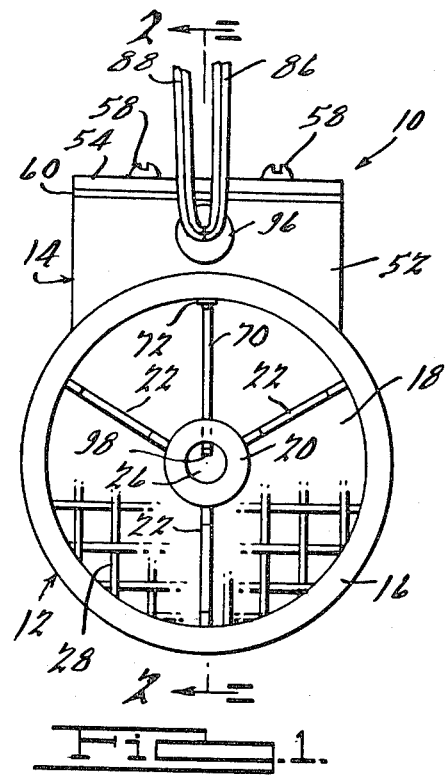
FIG. 1, is a top plan view of the preferred embodiment of the fluid flowmeter with a portion of the mesh broken away and the deflector assembly removed to illustrate the internal details thereof.

Referring to the drawing figures, the present invention provides a hot film/swirl mass air flowmeter 10 which is intended for automotive application to monitor mass air flow into a conventional internal combustion engine. A typical contemplated installation would entail incorporating flowmeter 10 into the air filter inlet horn present in most vehicles which is immediately upstream of the carburetor or injector body. Flow meter 10 would be employed to provide continuous and dynamic control of the fuel quantity delivered to the engine in response to the various speed, load, coolant temperature, and emissions control devices.

It is to be understood however that in its broadest sense, the present invention can be employed with equal success in nonautomotive applications and in applications involving fluids other than air or air gas mixtures. Accordingly, it is not to be construed as limiting in that context.

Figure 2A:
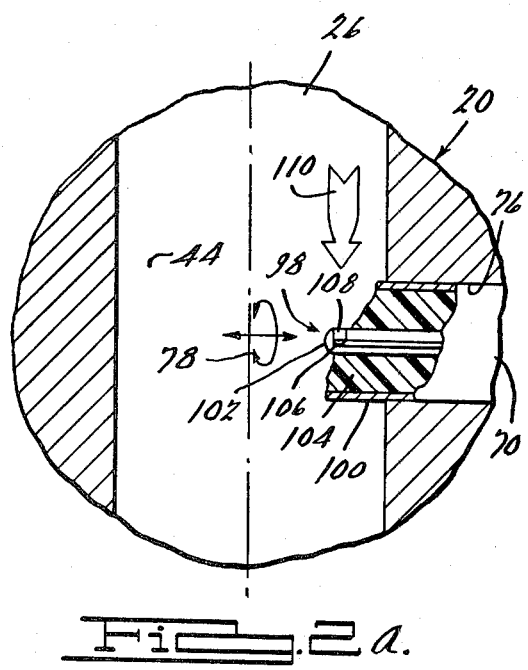
FIG. 2A is a fragmentary blow up of the throat area of the venturi of FIG. 1.
Figure 2:
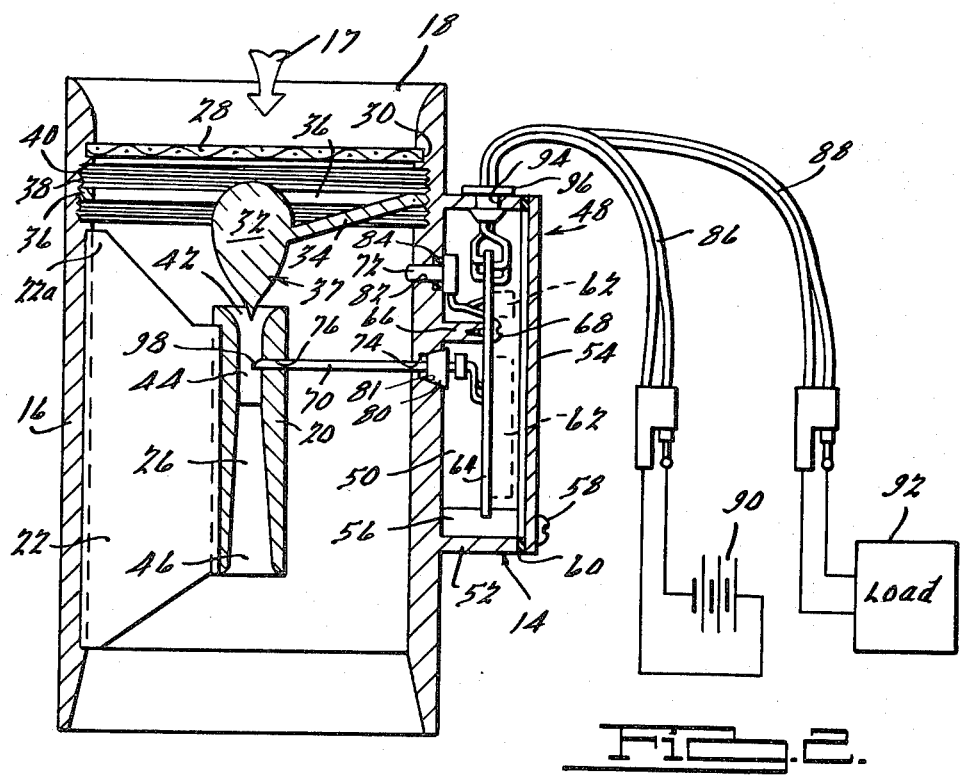
FIG. 2, is a cross-sectional view taken on line 2—2 of FIG. 1.

Referring to FIGS. 1 through 3, flowmeter 10 comprises a flowmeter section 12 and a sensor housing 14 integrally formed on the outer surface thereof. Flowmeter section 12 is generally cylindrical and comprises a tubular housing 16 which is open at both ends. It is to be noted that flowmeter section 12, with or without sensor housing 14, may be used in other environments as a mass flowmeter or a volumetric flowmeter. The air flow dynamics within flowmeter 10 are substantially as described in U.S. Pat. No. 4,164,144. The present invention represents an improvement thereof. Accordingly, the specification of U.S. Pat. No. 4,164,144 is incorporated herein by reference.

Housing 16 is open at both ends for inclusion in an air intake ducting system of an automobile internal combustion engine. As illustrated, air flowing through flowmeter 10 will pass downwardly as viewed in FIG. 2. An arrow 17 is provided to indicate direction of normal air flow through flowmeter 10. Housing 16 defines a main air flow passage 18 within which is disposed a venturi 20 and a set of 3 swirl vanes 22 which extend radially from the outer surface of venturi 20 to the inner surface of housing 16. Swirl vanes 22 are circumferentially evenly spaced about main air flow passage 18 and support venturi 20 in the position illustrated. The upstream most ends of swirl vanes 22 (uppermost as viewed in FIG. 2) are oriented to be parallel to the direction of air flow as it enters flowmeter 10 and thus constitute staightening vanes 22a which are integrally formed with the remainder of swirl vanes 22. The radially inner and outer most portions of vanes 22 are embedded in venturi 20 and housing 16, respectively. Although housing 16, venturi 20 and swirl vanes 22 are shown as an assembly of discrete components, it is contemplated that they could be integrally formed by casting or molding processes well known in the art. Only a single swirl vane 22 is illustrated in FIG. 2 which is intentionally misshapen to lie on a single plane parallel with the page to illustrate its interface with venturi 20 and housing 16. The actual shape of swirl vanes 22 and their interrelation with venturi 20 is best seen in the perspective view in FIG. 3 of a swirl vane/venturi subassembly 24. Although assembly 24 is illustrated as being composed as three individual swirl vanes 22, it is contemplated that more or fewer could be employed, depending upon the application contemplated without departing from the spirit of the present invention.

The optimum shape of swirl vanes 22 is empirically derived and depends upon the nature of the fluid being monitored as well as the range of flow rates contemplated. The arrangement found by the applicant to be particularly effective for a typical four or six cylinder engine defines a complex plane as is illustrated in perspective in FIG. 3. The radially outer most extent of vanes 22 are embedded in the inner surface of housing 16 to the extent indicated by the dotted lines 22b of vanes 22 in FIG. 3. In such an arrangement, it is contemplated that appropriate mating slots be formed in the outer surface of venturi 20 as well as the inner surface of housing 16 to receive swirl vanes 22, which can be press fitted therein, welded or otherwise suitably affixed for permanent retention.

The passageway through venturi 20 is defined as a secondary air flow passage 26 which will operate to intercept a portion of the air or fluid flowing through flowmeter 10 and reintroduce it back into the main air flow passage 18 downstream therefrom. Venturi 20 may be replaced by a straight walled tube or a substantially straight walled tube. However, the venturi tube has been found to provide a lower static pressure, particularly when the total air flow through flowmeter 10 is low, and therefore a very high fluid flow rate or velocity localized therein.

A wire mesh 28 is disposed at the upstream opening of flowmeter 10 to prevent large foreign objects from entering main air flow passage 18. Mesh 28 is retained in a circumferential groove 30 formed in the inner surface of housing 16 near the upper most extent thereof as viewed in FIG. 2. Referring to FIG. 2, immediately upstream of venturi 20 is a generally teardrop shaped deflector body 32. Body 32 is supported by several circumferentially spaced hanger members 34 (only one is illustrated) which interconnect body 32 with an externally threaded adjustment ring 36. The threads defined by ring 36 engage mating threads 38 within a recess 40 in the inner surface of housing 16. Threads 38 extend axially within main air flow passage 18 so as to permit selective axial repositioning of ring 36 and deflector body 32 therein. Ring 36 is disposed within recess 40 to minimized local fluid flow disruptions which could decrease flowmeter 10 efficiency. Body 32, hanger members 34 and adjustment ring 36 comprise a deflector assembly 37 and are integrally formed from plastic, metal or other suitable material. By axially advancing adjustment ring 36, body 32 can be selectively repositioned with respect venturi 20 for fine tuning purposes. Body 32 is aerodynamically shaped so as to generate a minimal amount of drag (and thus total pressure drop) while at the same time deflecting foreign particles from entering secondary air flow passage 26 for reasons which will become apparent herein below. The precise shape of body 32 was empirically derived for a specific intended application. The cross-section of hanger members 34 opposing fluid flow is minimized.

Venturi 20 is of conventional design and includes a generally converging inlet 42, a throat 44 and a diverging outlet 46. For the purposes of the present specification, throat 44 is defined as the point within secondary air flow passage 26 in which the fluid passing there through attains a maximum velocity. Laminar fluid flow can follow the contours of body 32 and enter inlet 42. Foreign particles will, because of their inertia, not be able to alter their course radially inwardly sufficiently to enter inlet 42 and will pass harmlessly through main air flow passage 18. Note that in FIG. 1, deflector body 32, hanger members 34 and adjustment ring 36 have been deleted for the sake of clarity of illustration.

Sensor housing 14 houses a constant temperature thermal anemometer indicated generally at 48. Referring to FIG. 2, wall members 52 integrally depend rightwardly (as viewed in FIG. 2) from housing 16 and coact therewith to define a rightwardly opening cavity 50. The opening to cavity 50 is substantially closed by a cover member 54 which is secured to wall members 52 via localized bosses 56 by suitable fastening means such as screws 58 through an intermediate rubber gasket or seal 60. The circuit components for anemometer 48 shown generally in phantom at 62, with two exceptions, which will be noted herein below, are assembled upon a suitable printed circuit board 64 which is mechanically insulatively secured to housing 16 via a localized boss 66 by a self tapping screw 68 or other suitable fastening means.

The two components of anemometer 48 which are electrically but not mechanically affixed to circuit board 64 comprise a hot film probe 70 and a temperature compensating resistor probe 72. It is contemplated that special commercially available high-response probes can be employed with modifications as described herein which, in light of the present specification, are well within the capability of one skilled in the art. In the preferred embodiment of the invention, the applicant employed probes manufactured by Thermal Systems, Inc., specifically hot film probe model 1269 and temperature compensated resistor probe model 1330. However, the resistation of these specific probe designs is intended to be by way of example only and not to be limiting in any sense.

Probe 70 passes radially inwardly through registering bores 74 and 76 in housing 16 and venturi 20, respectively. The sensing element 98 of probe 70 is positioned adjacent the wall of venturi 20 within throat 44 as is best illustrated in FIG. 2a. The diameters of bore 76 and probe 70 are maintained in very close tolerance so that probe 70 is otherwise free for axial displacement or rotation within bore 76 as indicated by arrows 78 while retaining a substantially airtight seal at the interface there between. The end of probe 70 opposite the sensing element 98 extends through bore 74 and terminates within cavity 50, and has an area of increased diameter 79 which is embracingly secured within a truncated frustuconically shaped elastomeric bushing 80 which, itself, is frictionally engaged within a rightwardly diverging bore 81, concentric with bore 74 within housing 16. Bushing 80 is constructed of rubber or the like and operates to permit selective axial and rotational repositioning of probe 70 when it is manually loosened.

To lock or secure probe 70 in a selected fixed relationship with the rest of flowmeter 10, bushing 80 is manually retightened by being pressed leftwardly within bore 81 as viewed in FIG. 2. Probe 72, like probe 70, emerges from within cavity 50, passes through a bore 82 in the wall of housing 16 and emerges within main airflow passage 18 slightly upstream of venturi 20. Suitable seals are provided, such as "o" rings 84, to prevent air leakage between main air flow passage 18 and cavity 50.

Two pairs of insulated electrical leads 86 and 88 are provided, which emerge from cavity 50 and provide for electrical interconnection of anemometer 48 with a D.C. power supply 90 and an electrical load 92, respectively. Load 92 can be any one of a number of devices such as those suggested herein above. Leads 86 and 88 emerge from sensor housing 14 through an aperture 94 and an intermediate grommet 96. Grommet 96 provides electrical isolation, sealing for cavity 50, as well as strain relief for leads 86 and 88.

FIG. 2a illustrates, on an enlarged scale, the detail of the sensing element indicated generally at 98 of probe 70. Probe 70 comprises a stainless steel outer sheath or protective tube 100 and an elongated quartz glass rod 102 coaxially disposed therein. An epoxy support insulator 104 electrically insulates rod 102 from sheath 100. Two gold foil conductive leads 106 diagonally spaced on the outer surface of rod 102 extend axially the entire length of probe 70 and are electrically connected to circuit board 64. Gold leads 106 terminate adjacent the left hand most extent of rod 102 and are electrically interconnected by a platinum resistive element 108. The resistive value of element 108 varies linearly with temperature. The upstream portion of sheath 100 is relieved as is the insulator 104 there adjacent to expose resistive element 108 to impinging fluid flow indicated generally at 110.

The sheath 100 and insulator 104 downstream of resistive element 108, however, is left intact to provide additional mechanical support and to render probe 70 sensitive only to fluid flow in the direction indicated by arrow 110. In the intended application of an automotive engine, a backfire would cause momentary reversed flow through secondary air flow passage 26. Because resistive element 108 is protected from fluid flow in the reverse direction, the cooling will be insignificant. Accordingly, the probe 70 and anemometer 48 is defined as having uni-directional flow sensitivity. It should now be apparent that body 32 is provided primarily to prevent foreign particles from entering secondary air flow passage 26 and impacting on sensing element 98 which is extremely delicate.

Probe 70 has been made repositionable to enable the user to fine tune flow meter 10 in two distinct ways. By moving resistive element 108 closer or further from the wall of venturi 20 defining throat 44, the sesitivity of anemometer 48 can be adjusted because more or less fluid will impact element 108 as a function of its position within throat 44 due to the velocity profile of fluid 110. It has been found that flow boundary effects will also provide effective self cleaning of element 108. Additionally, rotation of probe 70 to expose more or less of element 108 to fluid flow 110 will also provide a degree of sensitivity adjustment. Finally, although a hot film probe has been illustrated in the preferred embodiment of the invention, it is contemplated that other techniques such as hot wire or grid sensing could be employed. Accordingly, definitionally, for the purposes of the present invention a temperature dependant resistance element is broadly construed as any one of a number of types available.

The adjustable feature of probe 70 allows for unit to unit repeatability and the ability to compensate for mechanical or other variances in production from the design norm.

Referring to FIG. 4, a schematic diagram of anemometer 48 is illustrated. Anemometer 48 comprises an active power supply such as a D.C. differential amplifier 112 and a four element resistance bridge designated generally at 114. Bridge 114 is made up of four series connected elements, the point of interconnection between each adjacent pair of elements designated as nodes A through D. Nodes A and B, and B and C are interconnected by fixed value resistors 116 and 118, respectively. Nodes C and D are interconnected by probe 72 which, electrically, is a resistor whose value varies with ambient temperature. Finally, nodes D and A are interconnected by probe 70 which varies in resistance as a function of the velocity of the fluid 110 impinging thereagainst. Restated, the resistance of probe 70 will vary directly as a function of its ability to transfer heat to the relatively cooler fluid impinging thereon. Because a fast response time to instantaneous changes in the fluid flow rate is desirable in such devices, the thermal mass of the sensing element 98 of probe 70 has been minimized to provide more rapid and efficient transfer of heat directly to the fluid. It is this small thermal mass which has made most prior art devices extremely prone to breakage.

D.C. differential amplifier 112, node D and load 92 are grounded or, alternatively, commonly interconnected. Amplifier 112 has two input voltage terminals which are electrically connected to nodes A and C, an external power supply input terminal which is interconnected to D.C. power supply 90 through leads 86 and a bridge voltage output terminal which is electrically connected to node B and interconnected to load 92 through leads 88. An active power supply is defined as one which will continuously vary its output current, voltage, power factor or the like as a function of an input. Because the application of constant temperature thermal anemometers for measuring steady state as well as transient phenomena is fairly well known in the art, a detailed description of all aspects of operation of anemometer 48 will be deleted here for the sake of brevity.

OPERATION

The dynamics of flow passing through flow meter 10 is substantially as described in U.S. Pat. No. 4,164,144. Air enters the inlet of main passage 18 with a given axial or transport velocity. A portion of the air flows through the inlet 42 of venturi 20 and the remainder of the air flows through straightening vanes 22a to remove substantially all pre-swirl of the air due to upstream conditions. When the air leaves the straightening vanes, it has a substantially uniform and homogeneous axial flow pattern parallel to the central axis as it enters the swirl vanes 22.

The swirl vanes impart a tangential swirl velocity vector to the air. The axial and tangential velocity vector components of the swirl velocity form an air flow pattern (known as a forced-vortex flow) similar to a tornado which has a high velocity at its central axis and a diminishing velocity radially outward from the central axis. This resulting radial velocity gradient forms an associated radial pressure gradient having a low static pressure region at the central axis. Because of the relative axial positioning of swirl vanes 22 and outlet 46 of venturi 20, this low static pressure region is located directly downstream of venturi 20. This low pressure accelerates the air leaving the outlet of the venturi (forcing it to aspirate) and therefore amplifies the velocity of the air flowing through the venturi. As a result, the static pressure of the air in the venturi throat 44 is perportionally decreased. The total volumetric or mass air flow through the flowmeter may then be calculated in a known manner by known fluid flow principles. The static pressure in the venturi throat is directly related to the total air flow through the meter since the amount of air flowing through the venturi is directly related to the low static pressure produced by swirl vanes 22. Hence, the disclosed flow meter does not depend upon or use localized air flow techniques to measure air flow, which localized air flow in some modes of operation may be far from representative of total air flow through the meter. Although swirl vanes are the preferred way of ensuring correlation of static pressure in the venturi throat with total air flow, the present invention in its broadest sense relates to any instrumentality which will achieve the same result.

By placing a hot film surface sensor such as element 98 of probe 70 in the throat of venturi 20 using the constant temperature principal by varying or modulating the current flowing therethrough to maintain a constant film temperature, the sensed flow through the venturi is directly proportional to total flow. Restated, the electrical current required to keep the hot film temperature constant is directly related to mass flow. When mass flow rate is to be determined, the bridge 114 must be rebalanced as a function of ambient temperature.

The linear correlation between flow rate through the venturi and total flow rate has been experimentally verified by the applicant. Referring to FIG. 6, prototypes having differing venturi area ratios were tested. Each time the venturi flow to total flow relationship was linear and passed through the origin with only the (constant) slopes varying between units.

The major advantage of the present invention over pneumatic type prior art devices is reflected in the graph illustrated in FIG. 5. A gross attenuation in usable output signal was a major shortcoming in such prior art devices. As the graph suggests, the present invention provides a substantial amount of usable signal output, even at minimal flow rates, that substantially less complex downstream electronic control is required and the flowmeter can be detuned or desensitized to afford unit to unit repeatability.

The heated sensor (resistance element) 108 is part of the bridge circuit 114 that supplies electrical heating to the sensor to maintain its temperature above ambient. The rate of heat loss is a direct measure of the product of air density and velocity. The current through the sensor is so adjusted as to keep the sensor temperature, and thus resistance, constant. A feedback circuit is used to automatically maintain a desired (safe) hot film temperature for every velocity to prevent wire burn-up. A thin layer of sputtered quartz can be supplied to protect the sensor. Additionally, teflon or other light material can be supplied as a film to prevent contamination.

The provision of flow averaging means such as swirl vanes 22 effects integration of flow through the entire cross section of main air flow passage 18. It is this feature that makes the present invention insensitive to velocity inlet profile variations and enables single point sensing of total volumetric or mass flow rates.

It is to be understood that the invention has been described with reference to a specific embodiment which provides the features and advantages previously described, and that such specific embodiment is susceptible of modification as will be apparent to those skilled in the art. For example, the dimensions, relative sizing of the main and secondary air flow passages as well as the number and shape of swirl vanes 22 themselves can be altered in numerous ways to accommodate a specific application without departing from the spirit of the present invention. Accordingly, the foregoing description is not to be construed in a limiting sense.

What is claimed is:

1. A fluid flowmeter comprising:
means defining a main passage for the flow of a fluid therethrough;
means defining a secondary passage extending substantially parallel to said main passage and including an inlet for receiving a portion of the fluid flowing in said main passage, a throat and an outlet for discharging the portion back into the main passage;
a constant temperature thermal anemometer operative to monitor the rate of flow of said portion while within said throat and to generate a total flow rate output signal as a function thereof; and
means operative to receive at least a portion of the remaining fluid in said main passage and impart a velocity vector thereto tangential to said axis for creating a reduced pressure area at the outlet of said secondary passage.

2. The fluid flowmeter of claim 1, wherein said means operative to receive said remaining fluid comprises a set of swirl vanes radially disposed within said main passage at an angle oblique to the flow direction of said remaining fluid.

3. The fluid flowmeter of claim 2, further comprising straightening vanes disposed within said main passage upstream of said swirl vanes.

4. The fluid flowmeter of claim 4, wherein said straightening vanes are integrally formed with said swirl vanes.

5. The fluid flowmeter of claim 1, wherein said secondary passage comprises a venturi.

6. The fluid flowmeter of claim 1, wherein said anemometer comprises ambient termperature compensation means.

7. The fluid flowmeter of claim 6, wherein said ambient temperature compensation means comprises a fluid temperature sensing probe disposed upstream of said secondary passage.

8. The fluid flowmeter of claim 1, wherein said anemometer has uni-directional flow sensitivity.

9. A fluid flowmeter comprising:
means defining a main passage for the flow of a fluid therethrough;
means defining a secondary passage extending substantially parallel to an axis defined by said main passage, said secondary passage including an inlet for receiving a portion of the fluid flowing in said main passage, a throat and an outlet for discharging the portion back into the main passage;
a temperature dependent resistance element for sensing the rate of flow of said portion while within said throat;
means operative to establish an electric current within said element and to modulate said current to maintain said element at a substantially constant temperature whereby the extent of said modulation is representative of total fluid flow through said main passage; and means operative to receive at least a portion of the remaining fluid in said main passage and impart a velocity vector thereto tangential to said axis for creating a reduced pressure area at the outlet of said secondary passage.

10. The fluid flowmeter of claim 9, wherein said means operative to receive said remaining fluid comprises a set of swirl vanes radially disposed within said main passage at an angle oblique to the flow direction of said remaining fluid.

11. The fluid flowmeter of claim 10, further comprising straightening vanes disposed within said main passage upstream of said swirl vanes.

12. The fluid flowmeter of claim 11, wherein said straightening vanes are integrally formed with said swirl vanes.

13. The fluid flowmeter of claim 9, wherein said secondary passage comprises a venturi.

14. The fluid flowmeter of claim 9, further comprising ambient temperature compensation means.

15. The fluid flowmeter of claim 14, wherein said ambient temperature compensation means comprises a fluid temperature sensing probe disposed upstream of said secondary passage.

16. The fluid flowmeter of claim 14, wherein said ambient temperature compensation means is operative to sense ambient fluid temperature and modulate said current as a function thereof.

17. The fluid flowmeter of claim 9, wherein said temperature dependant resistance element is disposed within said throat.

18. The fluid flowmeter of claim 17, further comprising means operable for selective repositioning of said element.

19. The fluid flowmeter of claim 10, wherein said temperature dependant resistance element is operative to sense uni-directional fluid flow.

20. A fluid flowmeter comprising:

means defining a main passage for the flow of a fluid therethrough;

means defining a secondary passage extending substantially parallel to an axis defined by said main passage, said secondary passage including an inlet for receiving a portion of the fluid flowing in said main passage, a throat and an outlet for discharging the portion back into the main passage;

a temperature dependent resistance element for sensing the rate of flow of said portion while within said throat;

means operative to establish an electric current within said element and to modulate said current to maintain said element at a substantially constant temperature whereby the extent of said modulation is representative of total fluid flow through said main passage; and deflector means disposed adjacently upstream of said inlet.

21. The fluid flowmeter of claim 20, wherein said deflector means is selectively axially repositionable.

22. A fluid flowmeter comprising:

a main passage for the flow of a fluid therethrough;

a secondary passage disposed within and extending substantially parallel to an axis defined by said main passage, said secondary passage including an inlet for receiving a portion of the fluid flowing in said main passage, a throat and an outlet for discharging the portion back into the main passage;

means operative to receive at least a portion of the remaining fluid in said main passage and impart a velocity vector thereto tangential to said axis for creating a reduced pressure area at the outlet of said secondary passage;

a temperature dependant resistance element for sensing the rate of flow of said portion while within said throat; and means operative to establish an electric current within said element and to modulate said current to maintain said element at a substantially constant temperature whereby the extent of said modulation is representative of total fluid flow through said main passage.

23. The fluid flowmeter of claim 22, further comprising straightening vanes disposed within said main passage upstream of said remaining fluid portion receiving means.

24. The fluid flowmeter of claim 23, wherein said straightening vanes are integrally formed with said remaining fluid portion receiving means.

25. The fluid flowmeter of claim 22, wherein said secondary passage comprises a venturi.

26. The fluid flowmeter of claim 22, wherein said anemometer comprises ambient temperature compensation means.

27. The fluid flowmeter of claim 26, wherein said ambient temperature compensation means comprises a fluid temperature sensing probe disposed upstream of said secondary passage.

28. The fluid flowmeter of claim 26, wherein said ambient temperature compensation means is operative to sense ambient fluid temperature and modulate said current as a function thereof.

29. The fluid flowmeter of claim 22, wherein said temperature dependant resistance element is disposed within said throat.

30. The fluid flowmeter of claim 29, further comprising means operable for selective repositioning of said element.

31. The fluid flowmeter of claim 22, wherein said temperature dependant resistance element is operative to sense uni-directional fluid flow.

32. The fluid flowmeter of claim 22, further comprising deflector means disposed adjacently upstream of said inlet.

33. The fluid flowmeter of claim 22, wherein said deflector means is selectively axially repositionable.

34. A fluid flowmeter comprising:

a housing defining a main passage for the flow of a fluid therethrough and including a central axis;

a venturi disposed substantially concentrically within said main passage and comprising a converging inlet for receiving a portion of the fluid flowing in said main passage, a throat and a diverging outlet for discharging the portion back into the main passage;

a plurality of circumferentially spaced swirl vanes radially interconnecting said housing and venturi at an angle oblique to said axis, said swirl vanes collectively operative to receive at least a portion of the remaining fluid in said main passage and impart a velocity vector thereto tangential to said axis for creating a reduced pressure area at the outlet of said venturi passage; and a constant temperature thermal anemometer operative to monitor the rate of flow of said portion within said venturi while passing through said throat and to generate a total flow rate output signal as a function thereof, said anemometer comprising, a four element resistance bridge circuit, one of said elements comprising a temperature dependant resistor disposed within said throat for impingement of said fluid thereon, and an active power supply operative to establish an electric current within said resistor, to modulate said current to maintain said resistor at a substantially constant temperature to offset the cooling effect of the fluid impinging thereon, and to generate said signal in proportion to the extent of said modulation.

35. The fluid flowmeter of claim 34, wherein another element of said bridge circuit comprises an ambient fluid temperature sensor.

36. The fluid flowmeter of claim 35, wherein said ambient fluid temperature sensor is disposed within said housing upstream of said swirl vanes.

37. The fluid flowmeter of claim 36, wherein the remaining two elements of said bridge circuit comprise fixed value resistors.

38. The fluid flowmeter of claim 34, wherein said active power supply comprises a D.C. differential amplifier.

39. The fluid flowmeter of claim 34, further comprising means operable for selective radial and rotational repositioning of said temperature dependant resistor.

40. The fluid flowmeter of claim 34, wherein said temperature dependant resistance element is operative to sense uni-directional fluid flow.

41. The fluid flowmeter of claim 34, further comprising deflector means disposed adjacently upstream of said inlet.

42. The fluid flowmeter of claim 49, wherein said deflector means is selectively axially repositionable.

* * * * *